Jan. 27, 1942. E. E. ELMORE 2,270,940
HEATER
Filed July 13, 1939 2 Sheets-Sheet 1
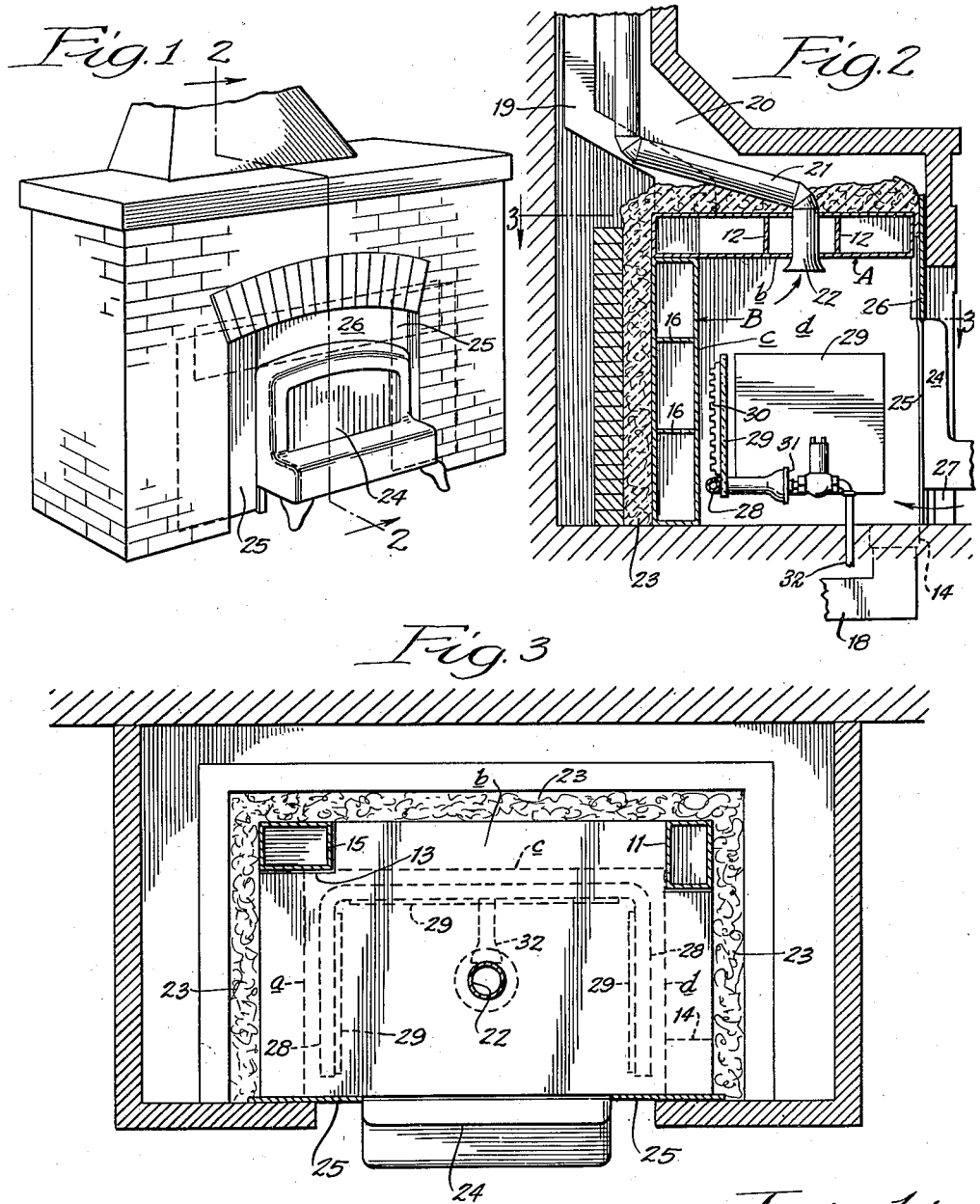
Inventor.
Elbert E. Elmore,
By Chunning & Chunning
Attorneys.

Jan. 27, 1942.    E. E. ELMORE    2,270,940
HEATER
Filed July 13, 1939    2 Sheets-Sheet 2
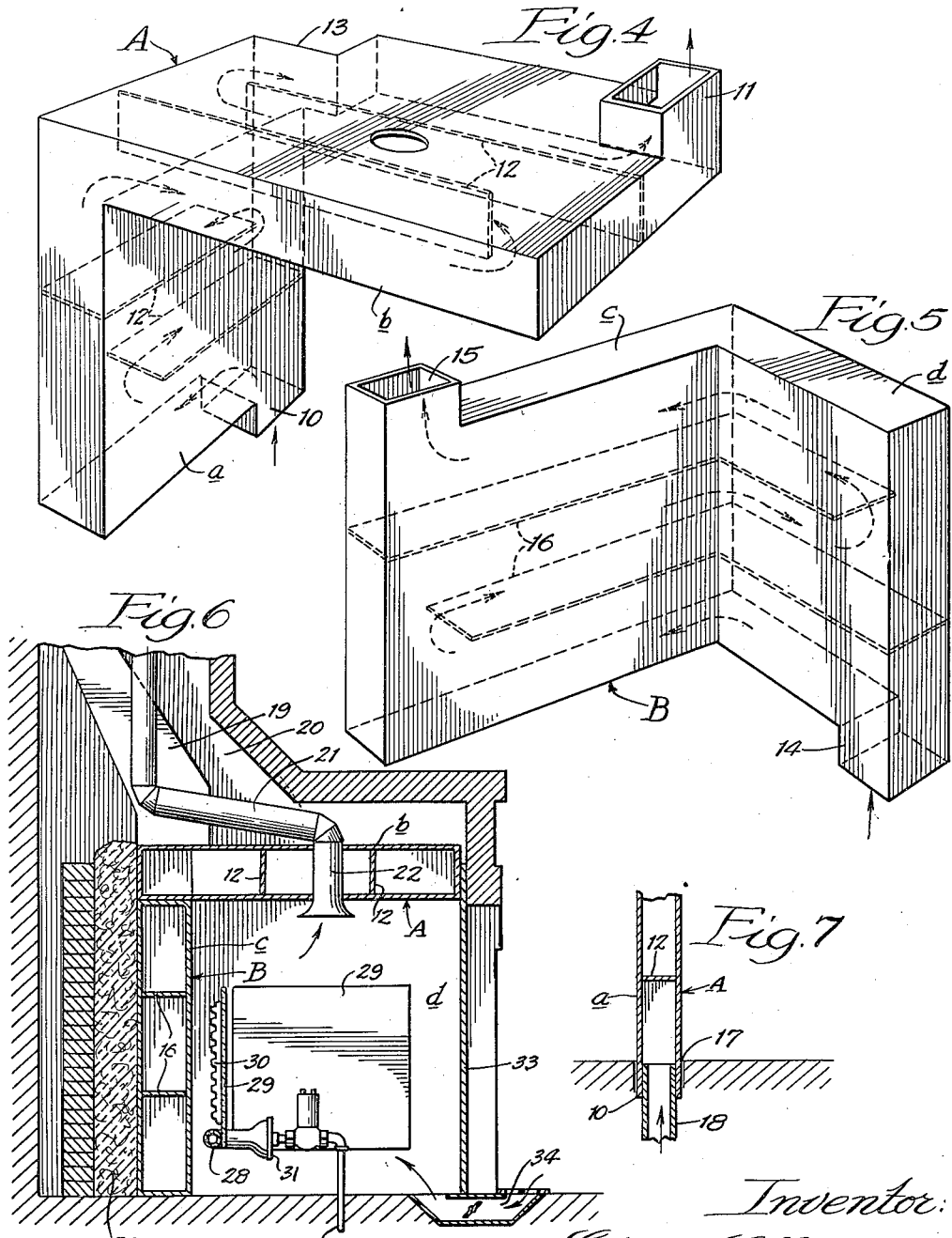

Patented Jan. 27, 1942

2,270,940

UNITED STATES PATENT OFFICE 2,270,940

HEATER

Elbert E. Elmore, Tinley Park, Ill., assignor, by mesne assignments, of one-half to Grover C. Elmore, Chicago, Ill., and one-half to Margaret Elmore, Tinley Park, Ill.

Application July 13, 1939, Serial No. 284,292

4 Claims. (Cl. 126—121)

By my present invention I have aimed to collect in one or more drums heat which otherwise would be wasted in an open fireplace, and to circulate such heat to remote parts of the house or building. The drums (of which a pair are herein illustrated) are inexpensive, convenient to install in fireplaces already built and are efficient in operation. The drums are also adaptable for use in various types of open fireplaces, particularly such as utilize in connection therewith a radiant burner as hereinafter described.

A suggestive embodiment of my invention is exhibited in the accompanying drawings wherein:

Figure 1 is a perspective view of an open fireplace equipped with a radiant burner;

Fig. 2 is a vertical section taken on line 2—2 of Fig. 1;

Fig. 3 is a horizontal section taken on line 3—3 of Fig. 2;

Fig. 4 is a perspective view of one of two complementary drum units;

Fig. 5 is a perspective view of a unit which is complementary to the one shown in Fig. 4;

Fig. 6, which is a view generally similar to Fig. 2, shows a modified construction in which a radiant burner may be dispensed with; and Fig. 7 is a detail in section showing the inlet opening of the heating drum in operative relation to a fresh air supply source.

As best shown in Fig. 2, use is made of one or more drum units having walls adapted to lie adjacent and extend along the sides of an open fireplace, except the bottom and the front thereof. According to the present exemplification, two such units may be used, each consisting of two communicating sections in right angular relation to each other. The two drum units are so formed as to complement each other when occupying positions close to the heated sides of the fireplace—adjacent the back, the top, and the two ends thereof.

The drum unit A shown in Fig. 4 comprises two narrow communicating sections $a$ and $b$ in right angular relation, each formed of spaced parallel walls connected by other walls along their edges to provide a closed chamber in the general form of an inverted L having an inlet air opening through a neck 10 depending from the bottom of section $a$ adjacent the rear end thereof and an outlet opening through a neck 11 rising from the top of section $b$ also adjacent the rear end thereof. Within each section I have affixed a plurality of baffle plates 12 defining a tortuous but continuous passage extending between the two openings. A corner recess 13 is provided in the section $b$ at a point adjacent its connection with section $a$ for a purpose which will presently appear.

The drum unit B of Fig. 5 which is of generally similar construction comprises two narrow communicating sections $c$ and $d$, in right angular relation, each section formed of spaced parallel walls connected by other walls along their edges to provide a closed chamber in the general form of an L, having an inlet air opening through a neck 14 depending from the bottom of section $d$ adjacent one end thereof. An outlet opening is formed through a neck 15 rising from the top of section $c$ adjacent the end thereof which is remote from the section $d$. Within each section I have affixed a plurality of baffle plates 16 defining a tortuous but continuous passage extending between the two openings.

The outlet neck 15 of the one unit is so positioned and formed as to fit into the corner recess 13 of the other unit, thus serving in a measure to lock them together when assembled in place. The two necks 10 and 14 depending from the bottoms of the two units so disposed and formed as to enter openings 17 in the floor of the fireplace (see Fig. 7). These necks when so positioned serve additionally to hold the drum units fixedly in operative position. A duct 18 extending horizontally beneath the fireplace communicates with these two openings, and delivers thereto air which flows under either natural or forced draft, according as may be desired.

The air to be heated enters the drum through the openings 17 and thence through the inlet necks 10 and 14; from these points of entry the air passes back and forth up through the units acquiring a progressively increasing temperature while so doing, and finally emerges through the outlet necks 11 and 15 to travel up through ducts 19 which may be arranged within the flue 20. I provide also within the flue a pipe 21 with a terminal extension 22 fitted through the drum unit section $b$ so as to open downwardly into the fireplace for the purpose of receiving and carrying off combustion wastes. The space outside of each drum unit is preferably filled with a fluid or plastic insulating material 23 which serves the dual purpose of preventing any substantial loss of heat therefrom by radiation, and of affording a continuous reinforcing surface for every part of the drum units.

The sources of heat, shown in Figs. 1 to 3, are (1) a radiant burner and (2) a pipe burner, both of which may conveniently use gas for the fuel. The radiant burner 24 is positioned at the front of the fireplace, and, by preference, is fitted closely within an opening therein formed by side plates 25 and an arched top plate 26. These plates are of a size to shut off the space between the sides and top of the radiant burner and the proximate walls of the fireplace, so that all of the heat which is radiated from the burner will be delivered into the room which it faces. Below the radiant burner is an opening 27 by which air may enter the space rearwardly thereof.

The pipe burner may conveniently comprise a pipe 28 bent into the form of a U so as to extend adjacent to and parallel with the proximate walls of the drum. This pipe is provided with a plurality of aligned orifices each constituting a burner opening so that the flames issuing therefrom will play close to the drum units. In order that the heat may be delivered more effectively, I have provided radiant shields 29 of refractory material, one for each of the three sides of the pipe burner, and each having a face comprising broken ribs 30 which, upon becoming incandescent, radiate heat whereby to raise the temperature of the air within the drum. This burner which is positioned horizontally above the fireplace floor is equipped with a bell 31 through which air is admitted to oxygenize the gas. Through a pipe 32 equipped with a valve (not shown) gas is led from any convenient source to the burner.

In Fig. 6 the radiant burner at the fireplace front is omitted and instead I provide a shield plate 33 which entirely closes the front opening. In order to support combustion at the pipe burner within the fireplace, a valved air duct 34 passes under this shield, being located within a suitable recess within the fireplace floor or hearth.

It will be apparent that the present heating drum is applicable to existing types of fireplaces as well as to fireplaces which may be specially designed for the reception of the drum. It is preferred, for convenience, that a gaseous fuel be employed, hence I have shown and described burners of a type to which gas may be supplied through ordinary fuel pipes. With the construction of Figs. 1–3 only the radiant burner need be used for local heat. If desired, only the pipe burner within the fireplace need be operated. When this is done, the drums will be heated so that air circulated therethrough will be elevated to a high temperature preliminary to its passing through one of the ducts to a distant point of discharge. By operation of this pipe burner rooms which are remote from the fireplace may be heated. To heat additionally the room wherein the fireplace is placed, the radiant burner should also be operated, it being optional to operate both such burners or just one.

The heating drum herein disclosed is advantageous because of its simplicity, the ease with which it may be fitted in place due to its two-piece interfitting construction, the effectiveness with which it may be used in conjunction with a pipe burner with which is associated a refractory shield, and its adaptability to a fireplace wherein is a radiant burner for heating a single room only. Experience has demonstrated that the present heating drum may be used advantageously in climates where extreme temperatures are not encountered, and that a comfortable temperature may be maintained in various rooms of a building, including the one wherein the fireplace is situated, by operation of the burners in the manner already noted.

I claim:

1. For use with an open fireplace from which leads a flue, a heating drum comprising a pair of units adapted to be fitted within the fireplace and each comprising a pair of spaced parallel walls adapted to extend in parallelism with two walls of the fireplace with the combined walls of the two drums extended along all walls of the fireplace except the floor and open front thereof, a pair of necks extending from each unit, one downwardly and the other upwardly, constituting inlet and outlet openings, respectively, there being a pair of openings in the fireplace floor communicating with an air supply source and each opening being adapted to receive one inlet neck whereby to maintain the two units in fixed position relative to each other and to the fireplace, and ducts in connection with the outlet openings leading from the units through the flue to remote points of discharge.

2. For use with an open fireplace from which leads a flue, a drum comprising a pair of interfitting units adapted to be fitted within the fireplace and each comprising a pair of spaced parallel walls adapted to extend in parallelism with two walls of the fireplace with the combined walls of the two drums extended along all walls of the fireplace except the floor and open front thereof, a burner within the fireplace extending adjacent these walls and below one wall of the two units adapted to heat the air therewithin, means affording inlet and outlet openings for each unit, and ducts in connection with the outlet openings leading from the units through the flue to remote points of discharge.

3. For use with an open fireplace from which leads a flue and the floor of which is provided with a pair of spaced openings leading to an air supply source, a two unit drum, each unit being complete in itself and having at its bottom a depending neck forming an inlet and at its top a second neck forming an outlet, the two units being so constructed and arranged as to interfit and, when so related, to occupy fixed positions around the interior of the fireplace, including the top thereof, with the depending necks seated within the floor openings, a connection from the flue extending downwardly through one of the units for exposure within the fireplace, and ducts in connection with the two outlets extending through the flue to remote points of discharge.

4. For use with an open fireplace from which leads a flue, a heating drum adapted to be fitted within the fireplace adjacent the walls thereof, a burner positioned within the fireplace and extending across the back thereof and along the sides of the same in substantial parallelism with the walls of the fireplace, a refractory shield extending upwardly from the burner at the back and sides of the fireplace in substantial parallelism with the adjacent surfaces of the drum and spaced therefrom to define a narrow space between the refractory shield and the drum for the passage of flames and the products of combustion produced by flames issuing from the burner, and a shield over the open front of the fireplace providing a closure therefor, and means for conducting air from the front of the fireplace to the space therewithin for supporting the combustion of flames issuing from the burner.

ELBERT E. ELMORE.